United States Patent
Hachtmann et al.

(10) Patent No.: US 9,676,496 B2
(45) Date of Patent: Jun. 13, 2017

(54) GROUND STATION WITH SHUTTLED DRUM FOR TETHERED AERIAL VEHICLES

(71) Applicant: X Development LLC, Mountain View, CA (US)

(72) Inventors: Brian Hachtmann, San Martin, CA (US); Damon Vander Lind, Alameda, CA (US)

(73) Assignee: X Development LLC, Mountain View, CA (US)

(*) Notice: Subject to any disclaimer, the term of this patent is extended or adjusted under 35 U.S.C. 154(b) by 485 days.

(21) Appl. No.: 14/143,787

(22) Filed: Dec. 30, 2013

(65) Prior Publication Data
US 2015/0158600 A1 Jun. 11, 2015

Related U.S. Application Data

(60) Provisional application No. 61/913,860, filed on Dec. 9, 2013.

(51) Int. Cl.
B66D 1/39 (2006.01)
B64F 3/00 (2006.01)
B66D 1/60 (2006.01)

(52) U.S. Cl.
CPC .......... *B64F 3/00* (2013.01); *B66D 1/39* (2013.01); *B66D 1/60* (2013.01)

(58) Field of Classification Search
CPC .... B66D 1/60; B66D 1/38; B66D 1/39; B64F 3/00
See application file for complete search history.

(56) References Cited

U.S. PATENT DOCUMENTS

| | | | |
|---|---|---|---|
| 1,811,623 A | 6/1928 | Ferguson | |
| 3,456,899 A * | 7/1969 | Burch | B66D 1/39 242/484 |
| 3,779,480 A * | 12/1973 | Cambou | H02G 11/02 242/478.2 |
| 3,804,370 A * | 4/1974 | Woodard | B66D 1/28 242/157.1 |

(Continued)

FOREIGN PATENT DOCUMENTS

| | | |
|---|---|---|
| CN | 102092471 | 6/2011 |
| EP | 0571207 | 11/1993 |
| EP | 0953539 | 11/1999 |

OTHER PUBLICATIONS

Written Opinion of the International Searching Authority in related PCT Application No. PCT/US2014/069094.

*Primary Examiner* — Emmanuel M Marcelo
(74) *Attorney, Agent, or Firm* — McDonnell Boehnen Hulbert & Berghoff

(57) ABSTRACT

A system may include an aerial vehicle, a perch platform configured to receive the aerial vehicle, and a ground station coupled to the aerial vehicle via a tether. The ground station may include a winch including a winch drum configured to move laterally and spin in a manner such that the tether is wound onto on the winch drum in a repeating pattern, possibly utilizing a fixed position levelwind. The system may additionally include a tower around which the winch and the perch platform can rotate about a vertical axis relative to the tower. The system may further utilize the tether forces on the levelwind to help move the perch platform around the vertical axis or be driven actively by a motor.

14 Claims, 8 Drawing Sheets

(56) References Cited

U.S. PATENT DOCUMENTS

| | | | | |
|---|---|---|---|---|
| 4,058,277 A * | 11/1977 | Kozakiewicz | ............ | B64F 3/00 244/17.13 |
| 4,087,060 A * | 5/1978 | Laky | ................. | B65H 54/2803 242/399.1 |
| 4,235,394 A * | 11/1980 | Fry | .................... | B65H 54/2854 242/397.3 |
| 5,485,972 A | 1/1996 | Mummery | | |
| 5,564,637 A * | 10/1996 | Berthold | ............ | B65H 54/2803 242/157.1 |
| 5,634,628 A * | 6/1997 | Schuch | .................... | B66D 1/39 254/331 |
| 6,811,112 B1 * | 11/2004 | Currie | ................ | B65H 54/2872 242/157.1 |
| 9,038,990 B2 * | 5/2015 | Krappinger | .............. | B66D 1/39 254/331 |
| 2005/0116079 A1 * | 6/2005 | Stevens | .................. | B60D 1/185 242/419.5 |
| 2010/0013236 A1 | 1/2010 | Carroll | | |
| 2010/0133385 A1 | 6/2010 | Olson | | |
| 2011/0260462 A1 | 10/2011 | Vander Lind | | |
| 2013/0161441 A1 | 6/2013 | Bjornenak et al. | | |
| 2013/0221679 A1 * | 8/2013 | Vander Lind | ........... | B64C 31/06 290/55 |

* cited by examiner

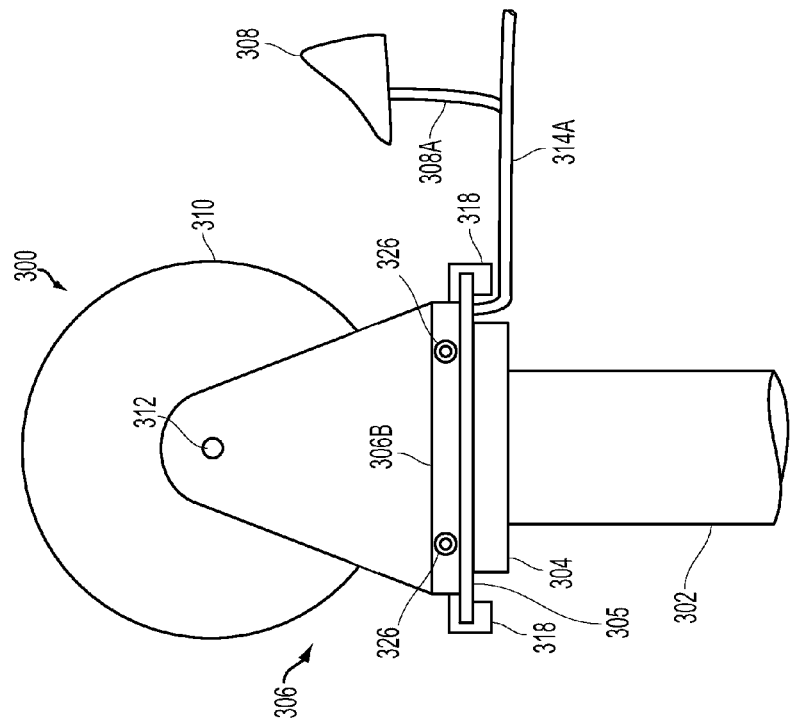
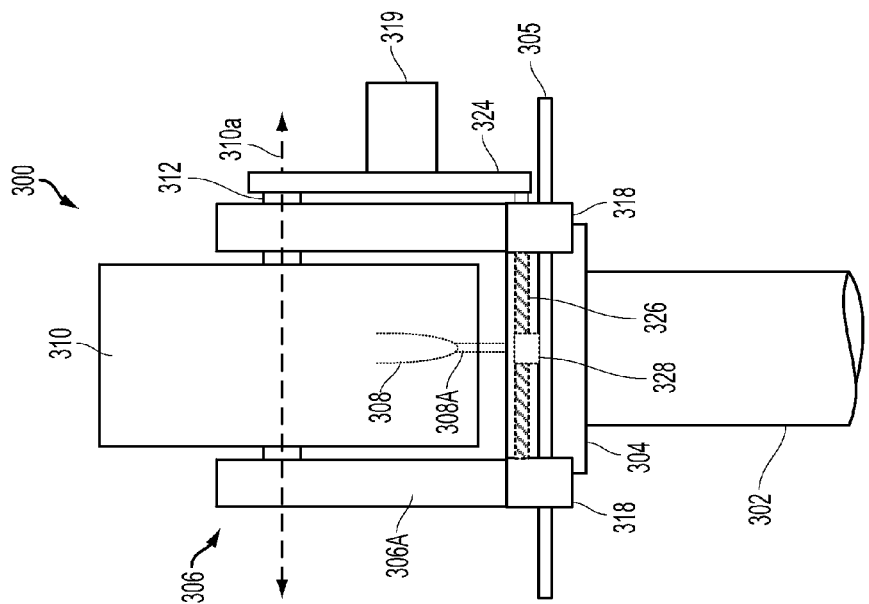

GROUND STATION WITH SHUTTLED DRUM FOR TETHERED AERIAL VEHICLES

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

The present disclosure generally relates to systems and methods that incorporate a ground station for tethering aerial vehicles such as those employed in crosswind aerial vehicle systems. Crosswind aerial vehicle systems may extract useful power from the wind for various purposes such as, for example, generating electricity, lifting or towing objects or vehicles, etc. Deploying and receiving the aerial vehicles to generate power may present difficulties due to, for example, changing wind conditions and/or turbulent wind conditions. Beneficially, embodiments described herein may allow for more reliable, safe, and efficient deployment and reception of aerial vehicles.

In one aspect, a ground station is provided. The ground station may include a platform and a winch. The winch may include a winch drum that may be coupled to the platform. The winch drum may be rotatable about a central axis. As the winch drum rotates, it may move a lateral distance relative to the platform along the direction of the central axis. The ground station may also include a tether that may be wound about the winch drum when the winch drum is rotated. Additionally, a levelwind may be rigidly coupled to the platform either directly or through various additional structures. The tether may pass through the levelwind during winding, and the levelwind may be configured to position the tether at a substantially fixed location relative to the platform such that as the tether is wound onto the rotating and laterally moving winch drum, the tether accumulates on the winch drum in a repeating pattern. For example, the tether may accumulate on the winch drum in a helical pattern.

In another aspect, a method is provided. The method may include rotating a winch drum in a first direction. The rotating may cause a tether to wind onto the winch drum and the tether may pass through a levelwind before winding onto the winch drum. The method may additionally include moving the winch drum a lateral distance relative to the levelwind along the direction of the winch drum's central axis of rotation during the rotation of the winch drum.

In a further aspect a system is provided. The system may include an aerial vehicle and a perch coupled to a platform. The perch may be configured to receive the aerial vehicle in a perched configuration. The system may also include a vertical tower and a rotating member. The rotating member may also couple the platform to the tower and be configured to permit the platform to rotate about a vertical axis relative to the tower. The system may additional include a winch drum coupled to the platform. The winch may include a winch drum that may be coupled to the platform. The winch drum may be rotatable about a central axis. As the winch drum rotates, it may move a lateral distance relative to the platform along the direction of the central axis. The ground station may also include a tether that may be wound about the winch drum when the winch drum is rotated. The tether may include a proximate portion coupled to the winch drum and a distal portion that extends outwardly from the winch drum and may be coupled to the aerial vehicle Additionally, a levelwind may be rigidly coupled to the platform either directly or through various additional structures. The tether may pass through the levelwind during winding, and the levelwind may be configured to position the tether at a substantially fixed location relative to the platform such that as the tether is wound onto the rotating and laterally moving winch drum, the tether may accumulate on the winch drum in a repeating pattern. The levelwind may be configured such that lateral bias from the tether on the levelwind from a change in the azimuth angle of the tether relative to a planar axis normal to the winch drum may cause the platform to rotate around the vertical axis towards the direction of the lateral bias.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 3D illustrates a rear view schematic of a ground station for an AWT, such as the AWT illustrated in FIG. 1, according to an example embodiment.

FIG. 3E illustrates a side view schematic of a ground station for an AWT, such as the AWT illustrated in FIG. 1, according to an example embodiment.

DETAILED DESCRIPTION

Figure 1:
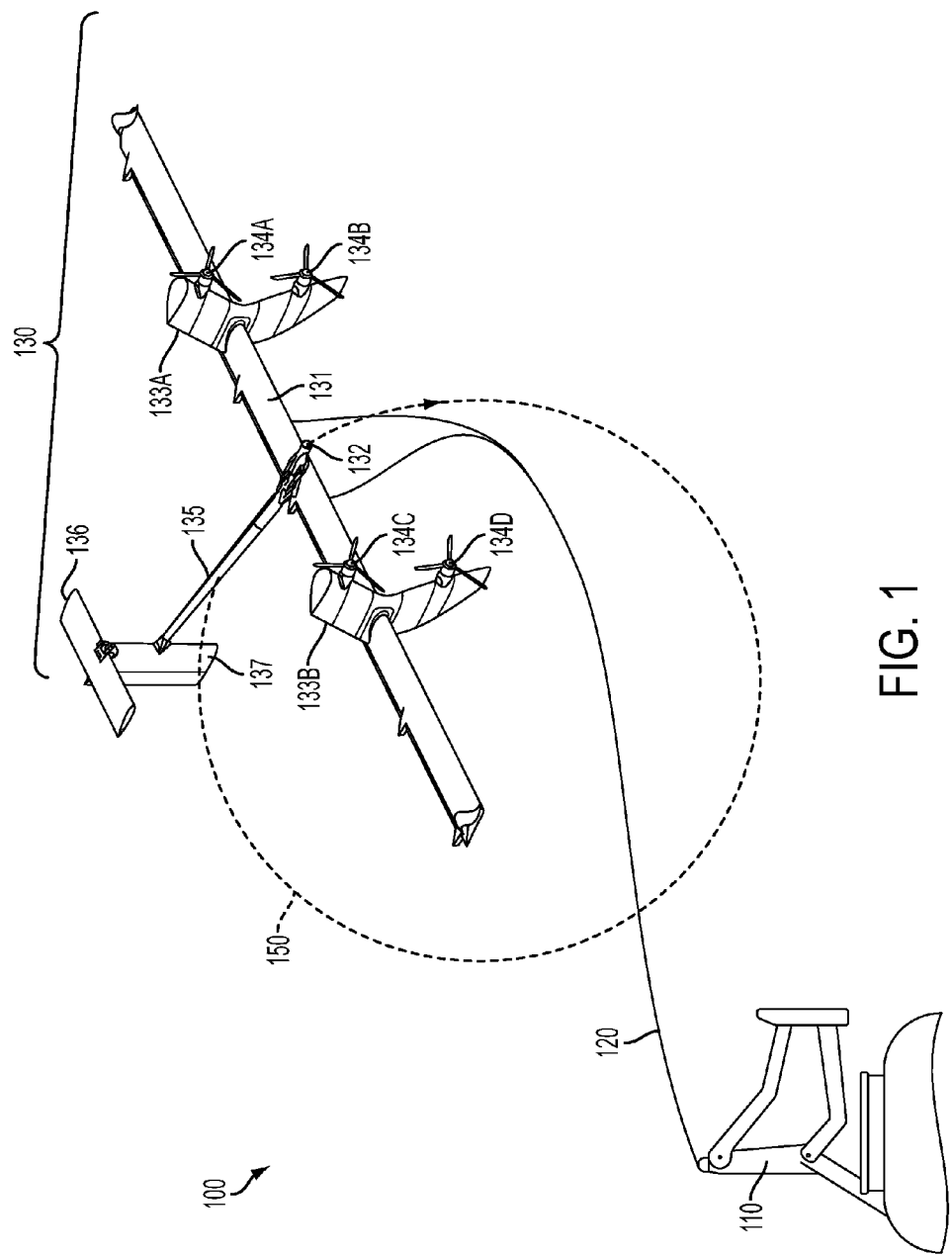
FIG. 1 illustrates an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. Overview

Example embodiments relate to aerial vehicles, which may be used in a wind energy system, such as an Airborne Wind Turbine (AWT). In particular, example embodiments may relate to or take the form of methods and systems for transitioning an aerial vehicle between certain flight modes that facilitate conversion of kinetic energy to electrical energy.

By way of background, an AWT may include an aerial vehicle that flies in a path, such as a substantially circular path, to convert kinetic wind energy to electrical energy via onboard turbines. In an example embodiment, the aerial vehicle may be connected to a ground station via a tether. While tethered, the aerial vehicle may: (i) fly at a range of elevations and substantially along a path, and return to the ground, and (ii) transmit electrical energy to the ground station via the tether. In some embodiments, the ground station may transmit electricity to the aerial vehicle for take-off and/or landing.

In an AWT, an aerial vehicle may rest in and/or on a ground station when the wind is not conducive to power generation. When the wind is conducive to power generation, such as when a wind speed may be 10 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some embodiments, the aerial vehicle may vertically ascend or descend in hover flight.

In crosswind flight, the aerial vehicle may be propelled by the wind substantially along a path, which as noted above, may convert kinetic wind energy to electrical energy. In some embodiments, the one or more propellers of the aerial vehicle may generate electrical energy by slowing down the incident wind.

The aerial vehicle may enter crosswind flight when (i) the aerial vehicle has attached wind-flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station.

To effectively deploy or receive a tethered aerial vehicle, the ground station generally uses a winch. Driven by a motor that applies torque to the winch, the winch may cause a winch drum to rotate to receive or deploy tether and thereby receive or deploy the tethered aerial vehicle. To help control a lay of the tether on or in proximity to the winch drum, and to prevent/reduce damage to or interference of the tether (e.g., point loads, high curvatures, or high friction), a levelwind (or fairlead) may be used along with the winch to guide the tether to and from the winch drum as the tether is deployed or received and experiences changes in inclination and azimuth angles. Certain lay patterns of the tether on the winch drum, such as successive helical wraps with space between each successive wrap, may provide the tether access to cooling from ambient airflow around the tether, as well as electrical isolation between various wraps of the tether around the shuttle drum in cases of damaged tether insulation.

Prior implementations of levelwind mechanisms would move the levelwind on a shuttle while the drum would remain stationary, as is appropriate for most commercial applications where levelwinding is required. However, in the case of flying wind turbines and other moving loads, the tether force may be utilized to orient a ground station and therefore the line of action of this force must be carefully managed relative to the ground station.

Disclosed embodiments relate to a ground station that includes a winch coupled to a platform, a levelwind that remains stationary relative to a platform, and a winch drum that moves relative to the platform and levelwind. For example, disclosed embodiments include an aerial vehicle ground station that may include a winch, a winch drum, a perch platform, and a tower. When the tether is deploying from (or being received by) the winch drum (e.g., when an aerial vehicle of the AWT system is deploying or returning), the winch drum may be configured to move horizontally along an axis of the winch drum as the winch drum rotates. An example embodiment includes having the drum translate one tether pitch per rotation, so as to maintain a constant line of action of the tether section engaging the levelwind and drum. Alternatively, the drum may translate some distance greater than one tether pitch per rotation, so as to create a gap between each subsequent wrap of tether. Additionally or alternately, a variable rate may be used, depending on the specific lay pattern that is desired. Additionally, the drum may have a convoluted surface with multiple convolutions and/or a continuous convolution each designed to cradle the individual wraps of tether about the drum. Accordingly, the drum may move horizontally at a rate sufficient to maintain the proper lay of the tether within a convolution.

Specifically, a leadwind may be rigidly coupled to the platform. The leadwind may function to position the tether onto the winch drum by forming a guide point through which the tether passes during winding. The guide point may be maintained in a substantially fixed location relative to the platform. The location may be fixed in one or more axes (e.g., fixed along a horizontal axis parallel to the winch drum central axis, or fixed along more than one axis such as a horizontal axis and a vertical axis). To ensure a good lay or smooth unwinding of the tether from the winch drum, when the winch drum is rotating the drum may move laterally along its central axis. It may move laterally continuously during its rotation or at fixed intervals during the rotation. During the lateral movement, the drum may move through one complete revolution, more than one revolution, or less than one revolution. The lateral movement may be relative to the substantially fixed guide point, such that the tether is wound onto the winch in repeating pattern, or unwound at a substantially smooth and constant rate. Additionally, in some embodiments, the winch and winch drum on a platform may be mounted atop a vertical tower and configured to rotate around the vertical axis of the tower. The platform (and winch and winch drum) may rotate in response to bias pressure applied by the tether to the levelwind. For example, if an AWT attached to the tether changes its azimuth angle, it may cause the tether to press against the side of the levelwind. This can cause the platform to advantageously rotate either passively through the effect of the bias pressure or actively by means of sensors which detect the bias pressure and then cause a motor or other active component to rotate the platform relative to the tower and in the direction of the bias. Laterally moving the winch drum instead of the levelwind and allowing or causing the winch and winch drum to rotate around the tower is advantageous at least because it can ensure that the tether tension is directed through the center axis of the platform and/or the tower. This can prevent off-axis forces which can create a large torque against the platform and/or tower. If the tether tension force is off axis, compensating structural and/or active components may be required to resolve the large forces placed on the winch by the tether. In the disclosed embodiments described herein, the winch maintains a constant line of action of the tether relative to the perch platform and ground station system, helping to keep the structural loads to a minimum.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while transitioning between hover and crosswind flight. In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters. However other lengths may be used as well.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors that may be spaced along main wing 131.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
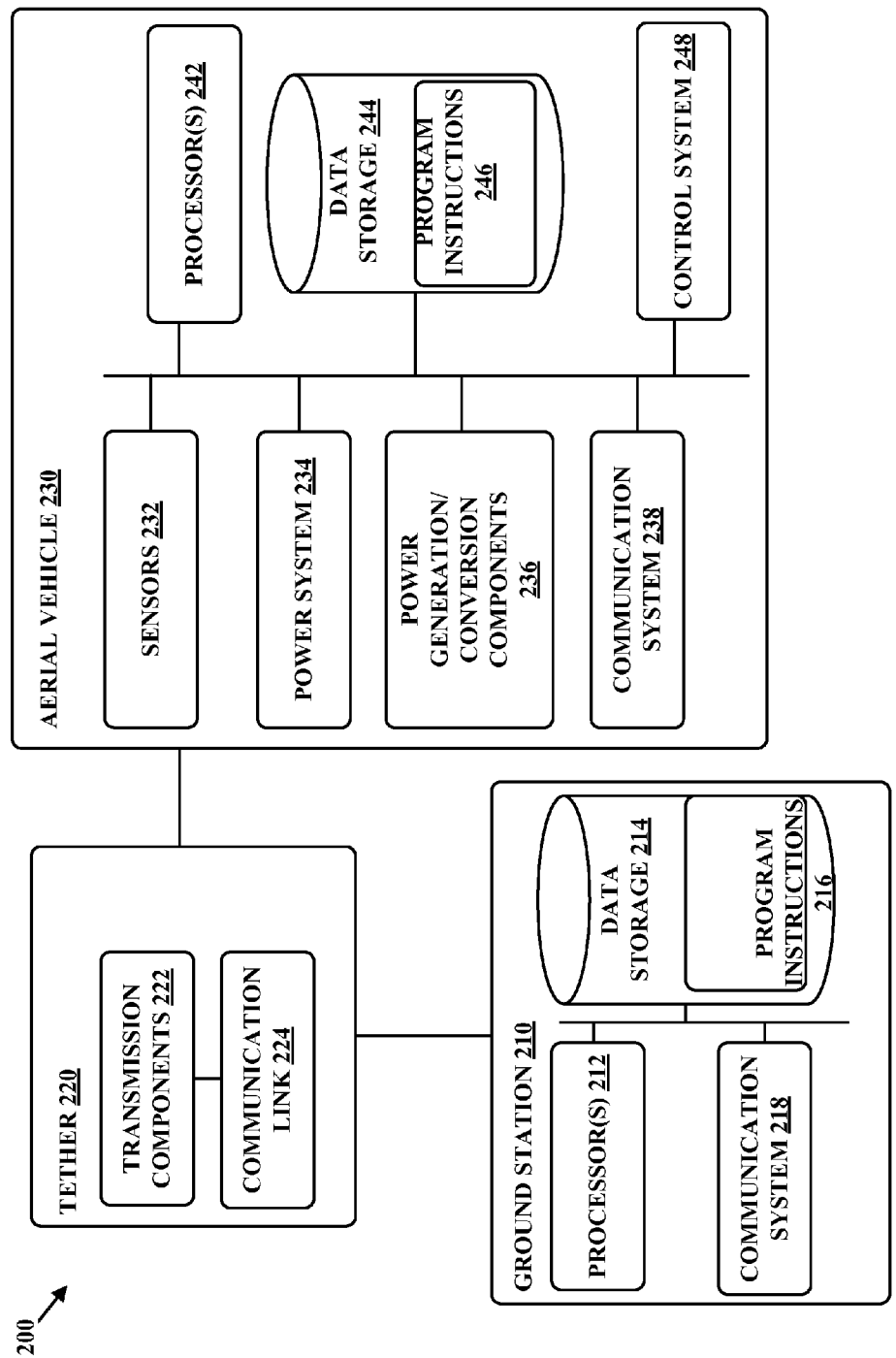
FIG. 2 illustrates a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. For example, vehicle 230 may employ drift mitigation through fault tolerant redundant position and velocity estimations. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

C. Illustrative Components of an AWT Ground Station

Figure 3A:
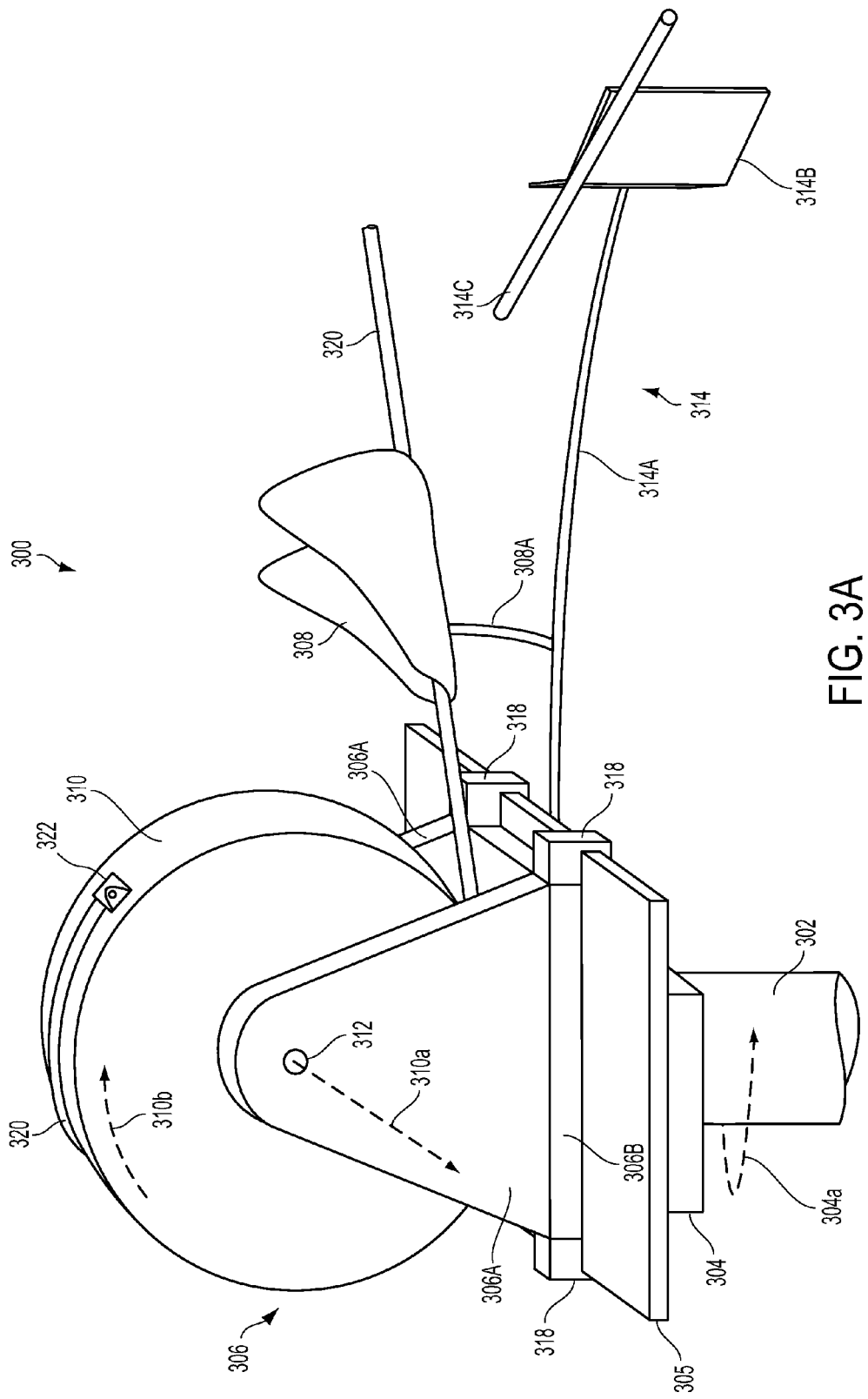
FIG. 3A illustrates a perspective view schematic of a ground station for an AWT, such as the AWT illustrated in FIG. 1, according to an example embodiment.
Figure 3B:
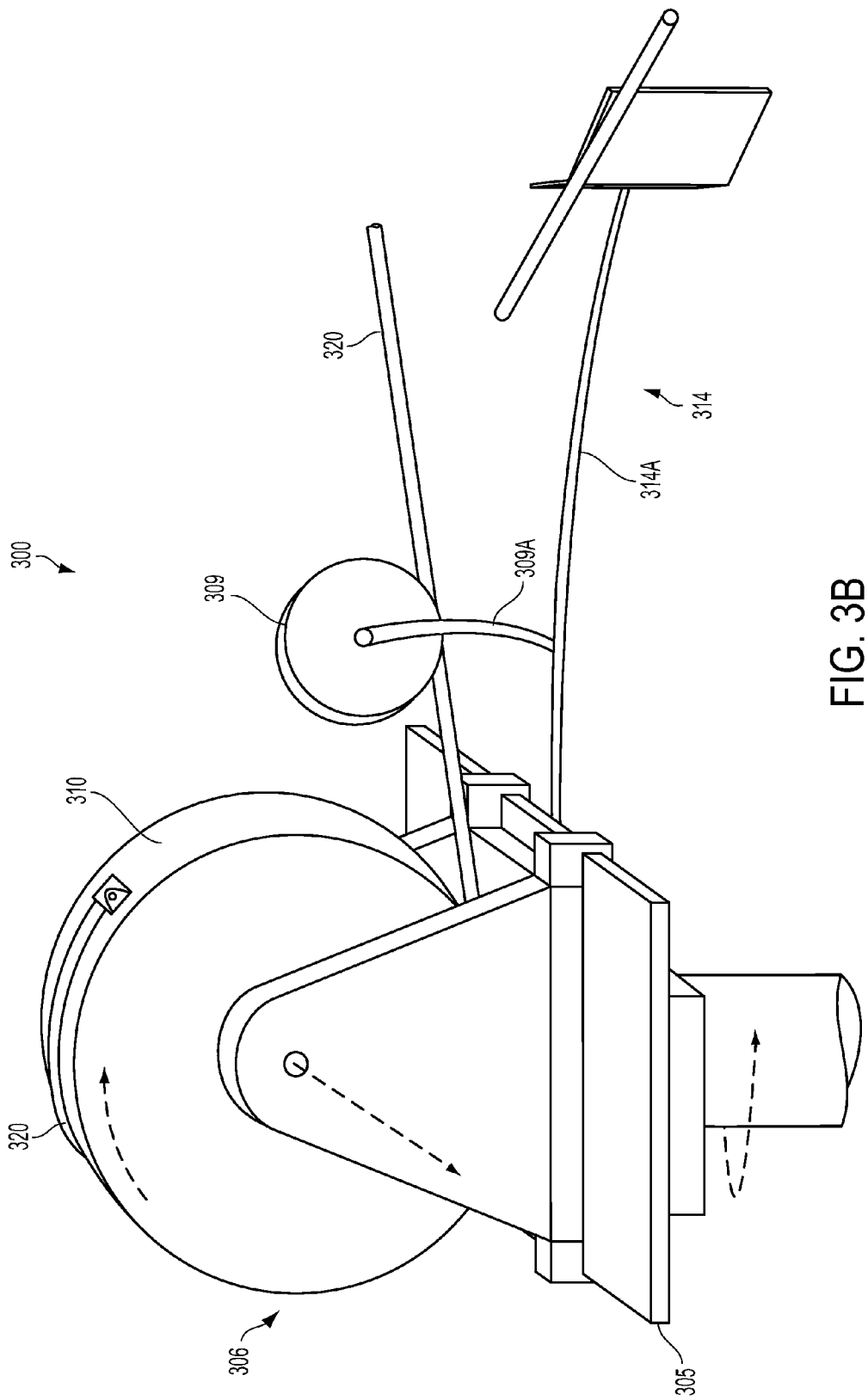
FIG. 3B illustrates a perspective view schematic of a ground station for an AWT, such as the AWT illustrated in FIG. 1, according to an example embodiment.
Figure 3C:
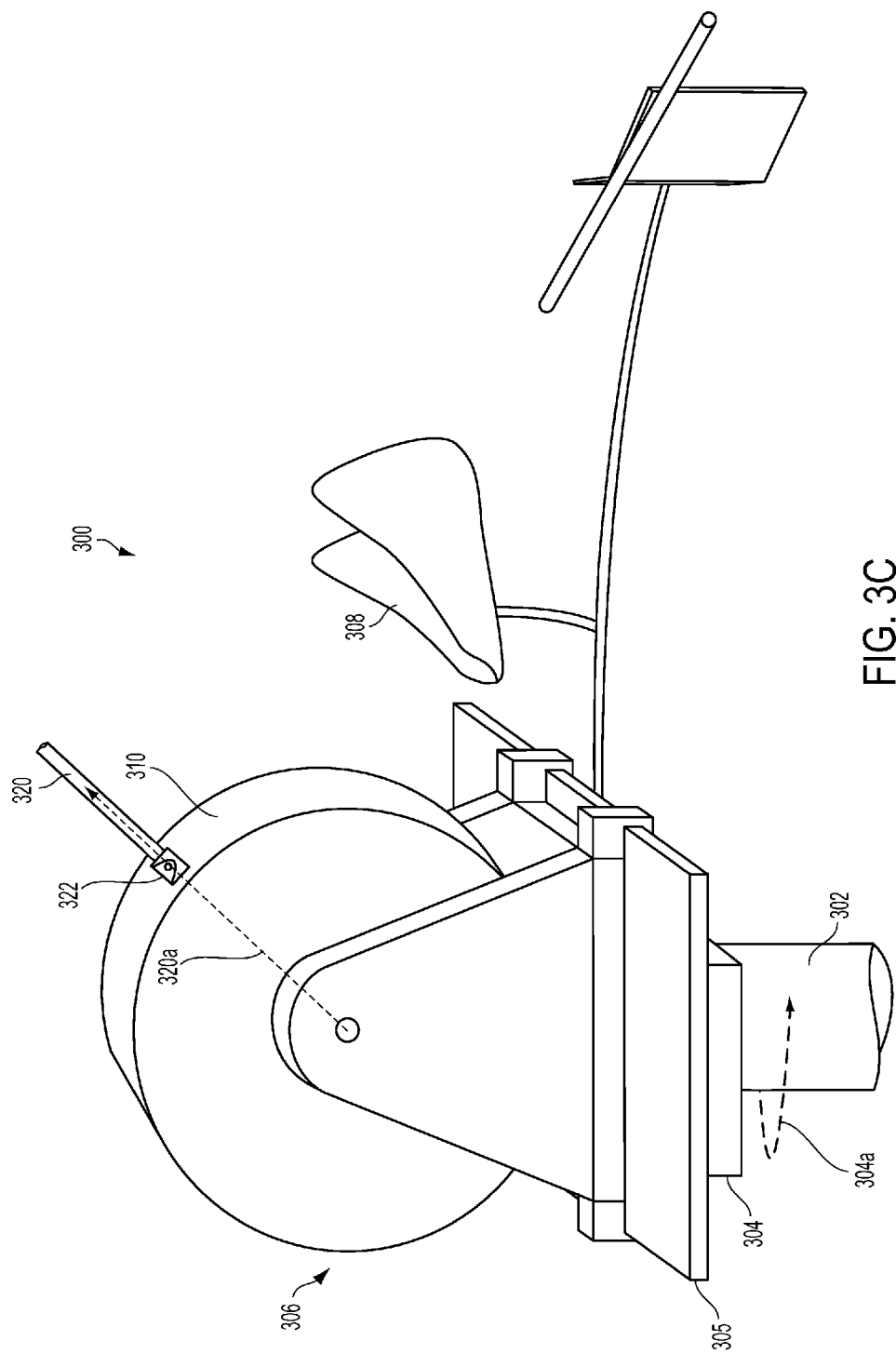
FIG. 3C illustrates a perspective view schematic of a ground station for an AWT, such as the AWT illustrated in FIG. 1, according to an example embodiment.

FIG. 3A illustrates a perspective view schematic of a ground station for an aerial vehicle of an AWT, such as the aerial vehicle 130 illustrated in FIG. 1. The ground station 300 may be the same as or similar to ground station 210 of FIG. 2, or ground station 110 of FIG. 1. FIGS. 3A through 3C are representational only and not all components are shown. For example, additional structural or restraining components may not be shown.

Ground station 300 may include vertical tower 302, platform 305, winch assembly 306, and leadwind 308. Tower 302 and platform 305 may be used to facilitate the perch and launch of an aerial vehicle such as aerial vehicle 130 of the AWT illustrated in FIG. 1. In some embodiments, platform 305 may be a perch platform upon which an aerial vehicle, such as aerial vehicle 130, can perch (e.g., when landing). Perch assembly 314 may include a perch rod 314A that is rigidly fixed to platform 305. Perch assembly 314 may further include a single-core perch panel 314B and/or a horizontal bar or catch 314C. Accordingly, when aerial vehicle 130 hovers into perch mode, a peg at the rear of a fuselage of aerial vehicle 130 may contact the perch panel 314B. Being configured in a convex manner, perch panel 314B may guide the wing and orientation of ground station 300 into an aligned position to receive aerial vehicle 130. Horizontal bar 316C may be a simple representation of several designs, any of which may accomplish the task of having a horizontal bar in the location where hooks on the leading edge of the wing (or fuse, or pylons, etc.) of the aerial vehicle may catch (connect with) the bar as the wing descends in its final motion before perching.

Ground station 300 may also include a winch drum 310 and winch assembly 306, both which may be coupled to platform 305. Platform 305 may be coupled to a rotating member 304 and thereby rotatably coupled to vertical tower 302. Via rotating member 304, winch assembly 306, winch drum 310, and platform 305 may rotate in azimuth around a vertical axis. Rotating member 304 may be, for example, a passive slewing ring or an active slewing ring with a motor drive. In this manner, platform 305 may be rotated actively or passively around a vertical axis (representatively shown in FIG. 3A by arrow 304a). While disclosed embodiments make use of a slewing ring, any rotational bearing or other configuration may be used that may allow platform 305 to rotate around tower 302. Tower 302 may be a tubular steel structure, although any structure that can resolve aerial vehicle flight loads and onto which a slewing ring or equivalent can be attached may be used.

As illustrated in FIG. 3A, tether 320 may be connected to winch drum 310 via ground side gimbal 322 and wound onto winch drum 310 when winch drum rotates in the direction indicated by arrow 310b. The tether 320 may be guided onto winch drum 310 via levelwind horn 308. Levelwind horn 308 may be rigidly coupled to platform 305. For example, levelwind horn 308 may be rigidly coupled via levelwind bracket 308A to perch rod 314a, which in turn may be rigidly coupled to platform 305.

Advantageously, platform 305 (and winch assembly 306, including winch drum 310) may rotate in response to bias pressure applied by tether 320 to levelwind horn 308. For example, if an AWT attached to tether 320 changes its azimuth angle relative to a planar axis normal to winch drum 310 (or platform 305), it may cause tether 320 to press against the inside side of levelwind 308 and therefore apply a bias pressure to levelwind horn 308. This can cause platform 305 to rotate passively towards the bias direction. Alternatively or additionally, levelwind horn 308 or levelwind bracket 308A may include sensors to detect bias pressure applied by tether 320 to levelwind horn 308. The sensors may be pressure sensors, force sensors, vibrational sensors, or any other sensors configured to detect bias pressure. In response to detecting bias pressure, a motor (not shown) or other active component may then cause platform 305 to rotate relative to tower 302 and in the direction of the bias. Allowing or causing platform 305 and winch assembly 306 to rotate around tower 302 and to face a tension force applied by tether 320 is advantageous because it may, among other advantages, reduce side loading forces and other undesirable forces acting on components of ground station 300.

As further illustrated in FIG. 3A, winch drum 310 may be rotatable about drum central axis 310a via drum axle 312 and may rotate in a clockwise direction (shown as arrow 310b) when tether is wound onto winch drum 310. Levelwind horn 308 may function to position tether 320 within a substantially fixed location relative to platform 305. In the example shown in FIG. 3A, levelwind horn 308 may position tether 320 so that it is restrained from moving horizontally or downwards during a tether winding condition. Additionally, levelwind horn 308 may function to restrain tether 320 during unwinding or other conditions.

Winch assembly 306 may also include support arms 306A and winch base 306B. Support arms 306A may carry winch drum 310 via drum axle 312. Additionally or alternatively, support arms 306A and winch base 306B may be in the form of an integrated structure or may be separable components which are coupled together. As tether 320 winds onto winch drum 310, winch drum 310 may be carried by winch assembly 306 horizontally along central axis 310a to facilitate guiding tether 320 onto winch drum 310, while levelwind horn 308 remains stationary relative to the horizontal movement of winch drum 310. To allow horizontal movement of winch drum 310 relative to platform 305 and to levelwind horn 308, and to prevent winch drum 310 from moving in any other planar direction including away from or off the platform, one or more restraining devices may be employed to slidably couple winch base 306B to platform 305. For example, as shown in FIG. 3A, linear bearings 318 may slidably couple winch base 306B to platform 305. The restraining devices may be any devices that restrict the movement of winch assembly in directions other than the desired horizontal direction. For example, the restraining devices may be dovetail slides, t-rail slides, planar bearings, or other devices.

FIG. 3B is an alternative perspective view schematic of ground station 300. FIG. 3B illustrates an alternative levelwind, in this case levelwind pulley 309 attached to perch rod 314A via levelwind bracket 309A. Levelwind pulley 309 may be a grooved pulley and function similarly to levelwind horn 308. For example, levelwind pulley 309 may function to position tether 320 within a substantially fixed location relative to platform 305. As shown in FIG. 3B, levelwind horn 308 may position tether 320 so that it is restrained from moving horizontally or upwards during a tether winding condition. Additionally, levelwind horn 308 may function to similarly restrain tether 320 during unwinding or other conditions. Other levelwind configurations beyond a levelwind horn 308 and a levelwind pulley 309 are contemplated and suitable levelwinds are not limited to those examples. For example, a levelwind may include one or more rollers to guide the tether onto winch drum 310.

FIG. 3C is an alternative perspective view schematic of the ground station 300 shown in FIG. 3A and illustrating the condition of the ground station 300 when an aerial vehicle (not shown) is in, for example, a crosswind flight orientation. In FIG. 3C, tether 320 has been fully deployed and has been completely unwound from winch drum 310. Because winch assembly 306 and platform 305 may rotate about tower 302 via rotating member 304, lateral azimuth forces from tether 320 (e.g., due to tension in the tether resulting from restraining a moving aerial vehicle) may act on winch assembly 306 and cause it and platform 305 to rotate towards the tether tension direction. For example, in a crosswind flying condition, a given aerial vehicle may move relative to the ambient wind direction and the winch assembly 306, including the winch drum 310, may rotate such that any azimuth tension force acting on winch assembly 306 is resolved to be substantially parallel or collinear to a coplanar tension force 320a that is normal to winch drum 310.

The ability to resolve azimuth forces via rotation of the platform provides substantial benefits. For example, the ground side gimbal 322 may act as a connection point of the tether 320 to the ground station 300. The ground side gimbal 322 may contain one or more bearings and other components which allow it to rotate in one or more axis to follow movement of the tether 320. Normally, a tether connection point to the drum might be used to resolve movements by the tether in azimuth and elevation. However, by utilizing the rotating member 304 to resolve some or all of the azimuth motion of the aerial vehicle and tether 320, the components of the ground side gimbal 322 can be expected to experience less stress and movement, resulting in lower costs for construction for the ground side gimbal 322, increased life expectancy, and smaller componentry in the gimbal (e.g., smaller gimbal bearings). Additionally, the ground station 300 may also resolve elevation forces resulting from motion of the aerial vehicle and tether 320. For example, with an open shoe levelwind, such as levelwind 308, the tether 320 may be free to move or oscillate in the elevation axis. In some cases, this movement or oscillation will be resolved by oscillation of the winch drum 310 about the drum's central axis, as opposed to oscillation or movement by the ground side gimbal 322 or by another type of levelwind or fairlead. Beneficially, elevation oscillation forces of the winch drum 310 can be resolved through large bearing assemblies that may be used as rotational bearings for the winch drum 322 to rotate about its axis, as opposed to being resolved through only the ground side gimbal 322 or certain types of levelwinds or fairleads.

FIG. 3D illustrates a rear view schematic of a ground station for an AWT, such as ground station 300. FIGS. 3D and 3E are representational only and not all components are shown. For example, additional structural or restraining components may not be shown. As shown in FIG. 3D, a motor 319 may be coupled to winch drum 310 via drive mechanism 324 and drum axle 312. Drive mechanism 324 may include a direct drive, one or more drive gear sets, one or more drive pulleys, or any other mechanism suitable for transmitting torque from a motor drive shaft to drum axle 312.

Winch assembly 306 may be moved horizontally (i.e., along central axis 310a) relative to platform 305 and levelwind horn 308 by, for example, one or more lead screws 326. Lead screws 326 may be rotatably coupled to winch assembly 306 via, for example, winch base 306B and also coupled to one more lead screw nuts 328 which are in turn rigidly coupled to platform 305. When lead screws 326 are rotated relative to lead screw nuts 328, winch assembly 306 may move horizontally relative to platform 305. In some embodiments, lead screws 326 and nuts 328 may include assemblies with matching continuous helical grooves that allow ball bearings to circulate and recirculate within the grooves, causing lead screws 326 to move horizontally relative to the nuts 328 when lead screws 326 are rotated relative to stationary nuts 328. In other embodiments, lead screws 326 and nuts 328 may have ACME, triangular, or other thread types sufficient to cause lead screws 326 to move laterally within the nuts when lead screws 326 are rotated relative to stationary nuts 328.

Motor 319 may be coupled to lead screws 326 via drive mechanism 324. Drive mechanism 324 may include a direct drive, one or more drive gear sets, one or more drive pulleys, or any other mechanism suitable for transmitting torque from a motor drive shaft to lead screws 326. Lead screws 326 may be driven at the same or a different rotational speed as drive axle 312. Alternatively, a different motor (not shown), such as a stepper motor or servo motor, may be used to rotate lead screws 326. Additionally, using lead screws is intended to be an example only and other means may be employed to cause winch assembly 306 to move in a horizontal motion along winch axis 312. For example, one or more hydraulic cylinders, one or more pneumatic cylinders, and/or one or more liner motors may be used in lieu of lead screws 326 and nuts 328.

FIG. 3E illustrates a side view schematic of ground station 300 shown in FIG. 3D and further illustrates example coupling locations for lead screws 326 and perch rod 314.

Figure 4:
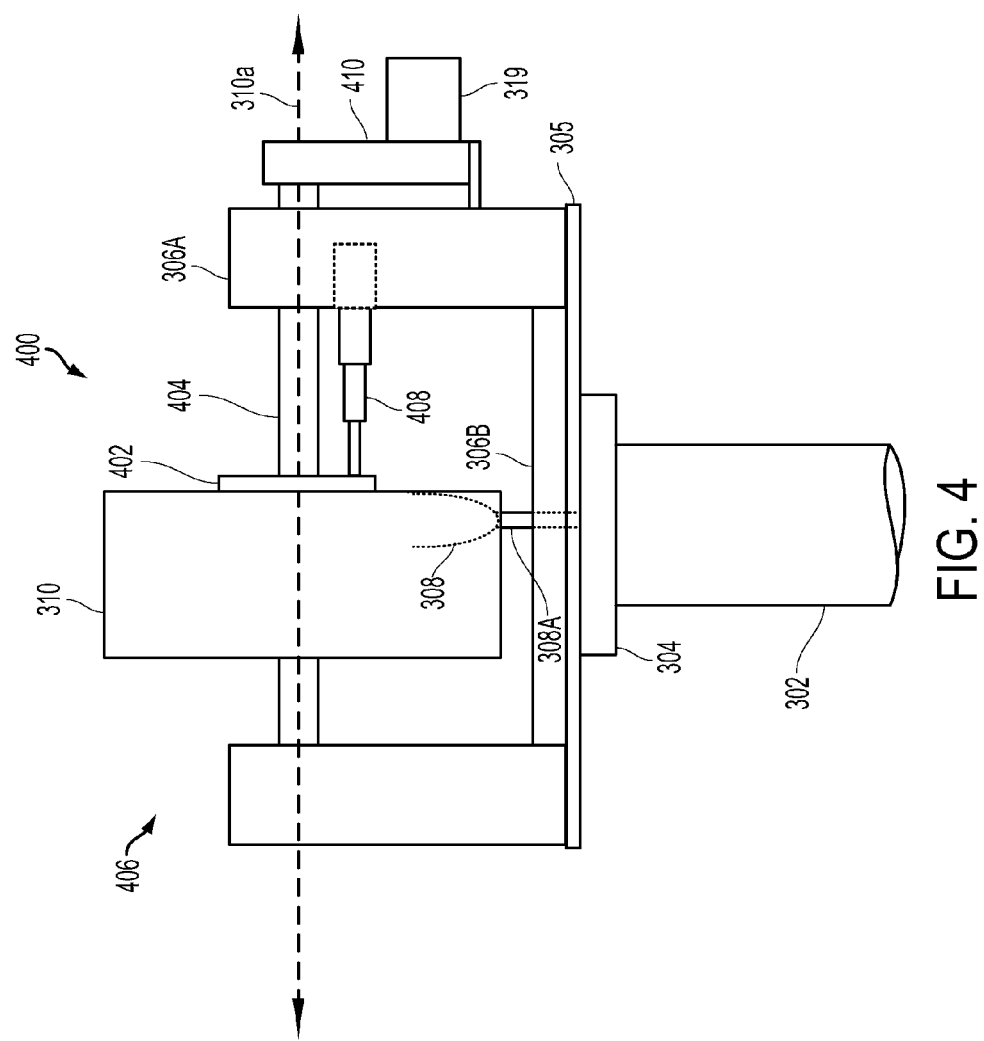
FIG. 4 illustrates a rear view schematic of a ground station for an AWT, such as the AWT illustrated in FIG. 1, according to an example embodiment.

FIG. 4 illustrates a rear view schematic of a ground station 400. Ground station 400 may include components similar to those in ground station 300. Ground station 400 provides an example of how a winch assembly may be rigidly fixed to a platform and a winch drum may instead move laterally within the fixed winch assembly. In ground station 400, winch drum 310 may be slidably coupled to axle 404 such that winch drum 310 may move horizontally on axle 404 relative to platform 305 and levelwind horn 308 (i.e., winch drum may move along central axis 310a). Drive motor 319 may rotate winch drum 310 via drive mechanism 410, which may be coupled to axle 404. Actuator 408 may be coupled to one or more support arms 306a and to one or more rotating surfaces 402, which in turn may be coupled to winch drum 310. In the example embodiment shown, actuator 408 may extend and contract horizontally and thereby cause winch drum 310 to move horizontally along axle 404. Actuator 408 may be any device configured to move winch drum 310 laterally. For example, actuator 408 may be hydraulic cylinder, a pneumatic cylinder, a linear motor, and/or a lead screw and nut assembly. Rotating surface 402 may provide a surface through which actuator 408 may exert force on winch drum 310. For example, rotating surface 402 may be slewing bearing assembly adapted to receive and transmit high axial loads. As another example, rotating surface may be a hardened or sacrificial surface against which a bearing assembly in the tip of actuator 408 rides. The lateral actuation system shown in FIG. 4 is intended to be an example only and any mechanism capable of moving winch drum 310 laterally along axle 404 is contemplated. For example, the rotating surface may cover both sides of the winch drum and the actuator may be a linear motor mounted to the winch base and may include a carriage that can exert lateral force on either side of winch drum via the rotating surface.

III. Illustrative Methods

Figure 5:
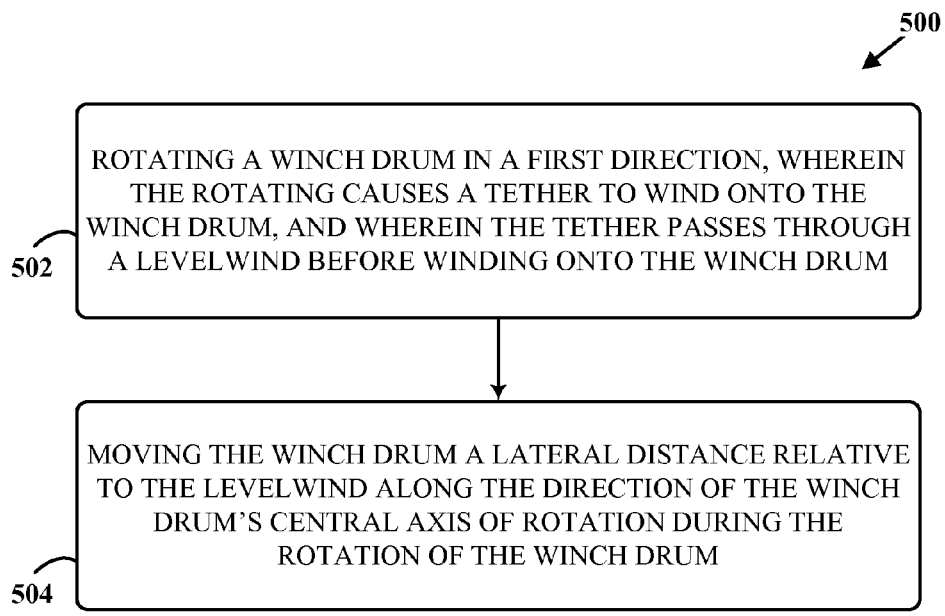
FIG. 5 is a flowchart of a method, according to an example embodiment.

FIG. 5 is a flowchart illustrating a method 500, according to an example embodiment. The method 500 may be used in retrieving a deployed aerial vehicle. Illustrative methods, such as method 500, may be carried out in whole or in part by a component or components of an aerial vehicle system, such as by the one or more components of the aerial vehicle 130 shown in FIG. 1, the aerial vehicle 230 shown in FIG. 2, the ground station 110 shown in FIG. 1, the ground station 210 shown in FIG. 2, and the ground station shown and described in reference to FIGS. 3A-3E and FIG. 4. For instance, method 500 may be performed by ground station 300 along with control system 248. For simplicity, method 500 may be described generally as being carried out by a ground station, such as ground station 300. However, it should be understood that example methods, such as method 500, may be carried out by other entities or combinations of entities without departing from the scope of the disclosure.

As shown by block 502, method 500 involves rotating a winch drum in a first direction. The rotating action causes a tether to wind onto the winch drum and the tether passes through a levelwind before winding onto the winch drum. The winch drum may be part of a ground station such as ground station 300 and may be similarly situated. Accordingly, the ground station may include a tower and a platform. In some examples, the winch drum may be rotated manually and thereby cause the tether to accumulate on the winch drum. For example, a ground station operator may physically rotate the winch drum (using e.g., a rotatable arm affixed to the winch) to wind the tether. In other examples, a control system or one or more processors and program instructions such as processors 212 and program instructions 216 may be executed to cause a motor to rotate the winch drum, thereby moving the tether onto the winch drum.

Block 502 describes moving the winch drum a lateral distance relative to the levelwind along the direction of the winch drum's central axis of rotation during the rotation of the winch drum. For example, as the winch drum rotates and accumulates tether around the drum, the drum may move horizontally along its axis at substantially the same rate that the spiral of tether accumulates across the surface of the winch drum. Additionally or alternatively, the drum may move horizontally in order to generate a desired repeating pattern of tether lay, or at some rate proportional to the rate that the spiral of tether accumulates across the surface of the winch drum. The drum may also move horizontally at some rate proportional to the rate at which is rotating, or at a variable rate depending on, for example, the specific lay pattern that is desired. Additionally, the drum may have a convoluted surface with multiple convolutions and/or a continuous convolution designed to cradle the individual wraps of tether about the drum. Accordingly, the drum may move horizontally at a rate sufficient to maintain the proper lay of the tether within one or more convolutions.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A ground station comprising:
   a platform;
   a winch base rigidly coupled to the platform;
   one or more support arms rigidly coupled to the winch base;
   an axle rotatably coupled to the one or more support arms;
   a winch drum coupled to the axle;
   a lateral drive mechanism coupled to the winch drum, wherein the lateral drive mechanism is configured to move the winch drum along the axle in a lateral direction relative to the platform;
   a tether adapted to be wound about the winch drum when the winch drum is rotated in a first direction; and
   a levelwind rigidly coupled to the platform, wherein the tether passes through the levelwind during winding, and wherein the levelwind is configured to position the tether at a substantially fixed location relative to the platform such that as the tether is wound onto the rotating and laterally moving winch drum, the tether accumulates on the winch drum in a repeating pattern.

2. The ground station of claim 1, wherein the lateral drive mechanism comprises a lead screw and a lead screw nut.

3. The ground station of claim 1, wherein the lateral drive mechanism comprises a hydraulic cylinder.

4. The ground station of claim 1, wherein the lateral drive mechanism comprises a pneumatic cylinder.

5. The ground station of claim 1, wherein the lateral drive mechanism comprises a linear motor.

6. The ground station of claim 1, further comprising a control station, wherein the control station is configured to dynamically control the lateral distance the winch drum moves during rotation of the winch drum.

7. The ground station of claim 1,
wherein the winch drum further includes a convoluted surface about which the tether winds, and wherein the lateral distance moved by the winch drum during rotation is based in part on the distance between convolutions on the convoluted surface.

8. The ground station of claim 1, wherein the levelwind comprises a levelwind horn.

9. The ground station of claim 1, wherein the levelwind comprises a levelwind pulley.

10. The ground station of claim 1, further comprising:
a vertical tower; and
a rotating member, wherein the rotating member couples the platform to the tower, and wherein the rotating member is configured to permit the platform to rotate about a vertical axis relative to the tower.

11. The ground station of claim 10, wherein the levelwind is configured such that a lateral bias from the tether on the levelwind from a change in the azimuth angle of the tether relative to a planar axis normal to the winch drum causes the platform to rotate around the vertical axis towards the direction of the lateral bias.

12. The ground station of claim 10, further comprising:
a bias sensor coupled to the levelwind, wherein the bias sensor is configured to determine a lateral bias exerted by the tether on the levelwind from a change in the azimuth angle of the tether relative to an axis normal to the winch drum;
a control station, wherein the control station is configured to causes the platform to rotate around the vertical axis towards the direction of the lateral bias.

13. A system comprising:
an aerial vehicle;
a perch coupled to a platform and configured to receive the aerial vehicle in a perched configuration;
a vertical tower;
a rotating member, wherein the rotating member couples the platform to the tower, and wherein the rotating member is configured to permit the platform to rotate about a vertical axis relative to the tower,
a winch drum coupled to the platform, wherein the winch drum is: (a) rotatable about a central axis and (b) during rotation, configured to move a lateral distance relative to the platform along the direction of the central axis;
a tether adapted to be wound about the winch drum when the winch drum is rotated in a first direction, wherein the tether includes a proximate portion coupled to the winch drum and a distal portion that extends outwardly from the winch drum and is coupled to the aerial vehicle; and
a levelwind rigidly coupled to the platform, wherein the tether passes through the levelwind during winding, and wherein the levelwind is configured to position the tether at a substantially fixed location relative to the platform such that as the tether is wound onto the rotating and laterally moving winch drum, the tether accumulates on the winch drum in a repeating pattern; and wherein the levelwind is also configured such that a lateral bias from the tether on the levelwind from a change in the azimuth angle of the tether relative to a planar axis normal to the winch drum causes the platform to rotate around the vertical axis towards the direction of the lateral bias.

14. The system of claim 13, further comprising:
a bias sensor coupled to the levelwind, wherein the bias sensor is configured to determine the lateral bias exerted by the tether on the levelwind from a change in the azimuth angle of the tether relative to an axis normal to the winch drum; and
a control station, wherein the control station is configured to causes the platform to rotate around the vertical axis towards the direction of the lateral bias.

* * * * *